June 13, 1950 W. T. P. KIRKHAM 2,511,719
SUBAQUEOUS BLOWPIPE
Filed June 28, 1946
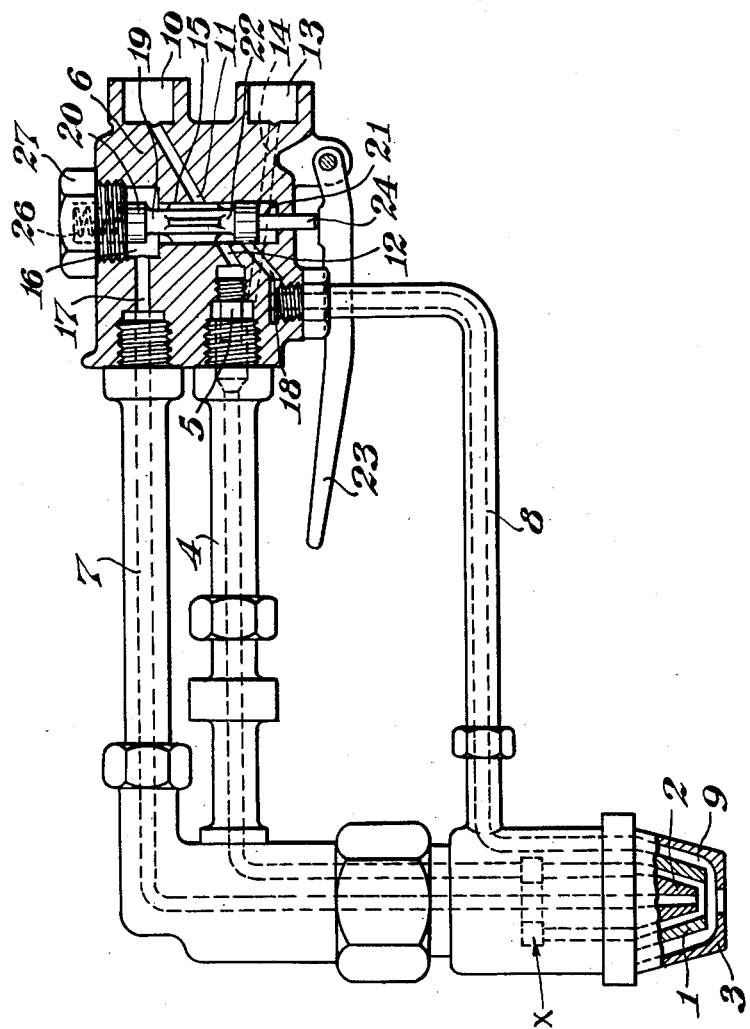
INVENTOR
WALTER T. P. KIRKHAM,
BY Emory L. Groff
ATTORNEY Patented June 13, 1950

2,511,719

UNITED STATES PATENT OFFICE 2,511,719

SUBAQUEOUS BLOWPIPE

Walter Thomas Patrick Kirkham, Southwick, near Brighton, England

Application June 28, 1946, Serial No. 680,163
In Great Britain July 3, 1945

7 Claims. (Cl. 158—27.4)

This invention relates to flame cutters for underwater use and of the type comprising an annular nozzle for supplying a mixture of oxygen and combustible gas to the flame, a central nozzle within the annular nozzle for supplying cutting oxygen, and a shield surrounding the central and annular nozzles to protect them from the water, air or oxygen being supplied to the shield under sufficient pressure to prevent water from entering the same.

In cutters of the above type as at present used three gas supply lines are provided; one for supplying hydrogen or other combustible gas to a mixing chamber communicating with the annular nozzle; one for supplying oxygen for combustion to the mixing chamber and cutting oxygen to the central nozzle; and one for supplying air or oxygen to the shield. In these known cutters a manually operable control valve is provided to enable the diver to turn the cutting oxygen on and off at will but the gas supplies to the mixing chamber and shield are maintained continuously whilst the flame is alight.

Now I have found that it is unnecessary to maintain a supply of oxygen or air to the shield during cutting and that a considerable saving can be effected by cutting off the supply of oxygen or air to the shield as soon as cutting oxygen is supplied to the flame. According to the present invention, therefore, I provide a flame cutter of the kind referred to above, wherein a manually operable control mechanism provided on the cutter to enable the diver to turn the cutting oxygen on and off at will is arranged so that it automatically cuts off the supply of air or oxygen to the shield when cutting oxygen is being supplied to the flame. The cutting oxygen and oxygen for the shield may be supplied from a single conduit which also supplies the oxygen for combustion to the annular nozzle that supplies the combustible mixture. The separate supply conduit heretofore used for supplying the shield may thus be dispensed with and the number of supply conduits required reduced to two.

One example of a cutter embodying my invention will now be described with reference to the accompanying drawing in which the cutter is shown in side view partly in section.

As shown in the drawing, the cutter comprises an annular nozzle 1 for supplying a mixture of oxygen and combustible gas to the flame, a central nozzle 2 within the nozzle 1 for supplying cutting oxygen and a shield 3 which surrounds the nozzles 1 and 2 and which enables the cutter to burn under water by protecting the base of the flame from contact with the water.

The annular nozzle 1 is supplied with a combustible mixture from a mixing chamber X which may be of conventional annular construction and which is supplied with oxygen and hydrogen or other combustible gas through concentric tubes 5 and 4, respectively screwed into sockets provided for them in a valve block 6, which is attached to the nozzles by means of the pipe 4 and two further pipes 7 and 8. An unthreaded portion of pipe 5 extends into the adjacent threaded end portion of pipe 4 and acts as a mixing chamber. The mixed gases pass down the pipe 4 and are further mixed as they enter the annular chamber X. The pipe 7 is provided for supplying cutting oxygen to the central nozzle 2 whilst the pipe 8 supplies the oxygen to the space 9 between the shield 3 and the nozzle 1. The valve block 6 is provided with a socket 10 adapted to be connected to a flexible pipe for the supply of oxygen and the socket 10 is in permanent communication through ports 11 and 12 in the block 6 with the pipe 5 through which oxygen is supplied to the mixing chamber. The valve block 6 is also provided with a socket 13 for connection to a flexible conduit for supplying hydrogen or other combustible gas and the socket 13 is in permanent communication through a port 14 in the body 6 with the pipe 4 which supplies the mixing chamber with combustible gas.

The ports 11 and 12 lead to and from a cylindrical valve chamber 15 formed in the body 6. The chamber 15 communicates at one end with a chamber 16 which is connected by a port 17 to the socket that receives the pipe 7. The other end of the chamber 15 communicates with a port 18 to which the pipe 8 is connected. Mounted in the chamber 15 is a double-acting piston valve 19 having two valve heads 20 and 21 each of which is a sliding fit in the chamber 15, the two valve heads being connected together by a part 22 which is of smaller diameter than the chamber 15 and is formed with flutes or projections having a sliding fit with the walls of the chamber 15. The valve is designed so that, when it is moved upwards as seen in the drawings so that the valve head 20 passes completely into the chamber 16, communication is established between the chamber 15 and the chamber 16, but the valve head 21, by entering the lower end of the chamber 15, shuts off communication between the chamber 15 and the port 18. On movement of the valve in the opposite direction, the head 21 is withdrawn from the chamber 15 so as to allow oxygen to pass from the chamber 15 into the port 18 whilst at the same time the head 20 enters the chamber 15 and shuts off the chamber 16 therefrom. The valve is thus movable to either of two positions in one of which oxygen from the socket 10 is supplied to the pipe 7 but not the pipe 8 whilst in the other position oxygen is supplied to the pipe 8 but not the pipe 7. The valve 21 does not cut off the passage 12 at any time. The valve is adapted to be operated by means of a hand lever 23 which abuts against a stem 24 formed on the valve 22 and projecting through the wall of the block 6, a spring 26 accommodated in a cap 27 screwed to the block 6 being arranged so that it tends to move the valve against action of the lever 23 and thus keeps the stem 24 in contact with the lever. Although the lever shown in the drawing is located under the valve block 6, it will be understood that the mechanism may be arranged so that the lever is located above the block 6 if desired.

In the use of the cutter, the mixing chamber which feeds the nozzle 1 is continuously supplied with oxygen and combustible gas from the sockets 10 and 13 in the usual way and, when the lever is operated so as to move the valve 22 against action of the spring 26, cutting oxygen is supplied from the socket 10 through the pipe 7 to the central nozzle 2. The supply of cutting oxygen is thus under the control of the diver as usual. In the present invention, however, the shield cavity 9 is not supplied continuously from a third supply conduit attached to the cutter is in under-water flame cutters hitherto used but is supplied from the socket 10 under the control of the valve 21 which automatically cuts off the supply of oxygen to the shield when the diver turns on the cutting oxygen by operating the lever 23. The supply of oxygen to the shield cavity 9 is thus controlled automatically so that oxygen is supplied to the shield cavity when the cutter is being lighted and during the process of preheating the work but is not supplied to the shield when the flame is supplied with cutting oxygen.

The construction shown in the drawing is given by way of example only and may be modified in many ways. Valve members adapted to seat upon conical seats may be employed instead of the piston valve heads shown in the drawing, or a rotary valve device may be used. Instead of a single double-acting valve member, two separate valves mechanically coupled to a common hand lever or other manual control member may be used.

Any known or preferred regulating devices may be provided for regulating the flow of hydrogen to the mixing chamber and for regulating the flow of oxygen to the mixing chamber, cutting nozzle and shield cavity respectively. The pressure of the cutting oxygen and the pressure of oxygen in the shield cavity can thus be regulated independently of one another although both are supplied from the same oxygen supply conduit.

By means of the present invention, an under-water cutter with shield feed differs very little from a normal (i. e. above-water) cutter, as it only makes use of the normal oxygen and hydrogen or other gas two supply lines, and unlike previously used two-line cutters, the cutter is fully effective at any depth of water because it incorporates the features of a three-line supply at the operating or cutting end. Also, by providing for an automatic cut-off of the shield supply during cutting the "radius" effect to the top or working edges of the cuts is eliminated, and the shield is only supplied with the effective minimum supply of oxygen when the shield supply is required, e. g. when lighting up.

When the foregoing arrangement is used the pressure drop in the oxygen line to the mixing chamber is not so marked as when this supply does not supply the shield, i. e. one supply or bleeding ceases as another comes into operation. It will assist if the supply of each slightly overlaps the other so that at no time is the flame left without either the shield or cutting supply.

I claim:

1. A flame cutter for under-water use comprising an annular nozzle, a central nozzle mounted within said annular nozzle, a protective shield surrounding said nozzles, a conduit for supplying combustible gas to said annular nozzle, a second conduit for supplying combustion-supporting gas to said annular nozzle, a third conduit for supplying cutting oxygen to said central nozzle, a fourth conduit for supplying air or oxygen to said shield, a valve block connected to said conduits a chamber in said body, a valve member movable within said chamber and including two spaced portions closely fitting said chamber and a portion intermediate said spaced portions and separated from the wall of said chamber by a space in communication with said second conduit, a second chamber in said valve block and communicating with said third conduit, said second chamber communicating with said first chamber in a certain position of said valve member and said first and second chambers being closed to one another in a second position of said member, said fourth conduit being in communication with the space of said first chamber in the second position of said member and closed to said first chamber in the first position of said member, a fifth conduit in said body connectible to a supply of oxygen and in communication with said first chamber, a sixth conduit in said body connectible to a supply of combustible gas and communicating with said first conduit, and means for moving said member.

2. A flame cutter for under-water use comprising an annular nozzle, a central nozzle mounted within said annular nozzle, a protective shield surrounding said nozzles, a conduit for supplying combustible gas to said annular nozzle, a second conduit for supplying air or oxygen to said annular nozzle, a third conduit for supplying cutting oxygen to said central nozzle, a fourth conduit for supplying combustion-supporting gas to said shield, a valve block connected to said conduits a chamber in said body, a valve member movable within said chamber and including two spaced portions closely fitting said chamber and a portion intermediate said spaced portions and separated from the wall of said chamber by a space in communication with said second conduit, a second chamber in said valve block and communicating with said third conduit, said second chamber communicating with said first chamber in a certain position of said valve member and said first and second chambers being closed to one another in a second position of said member, said fourth conduit being in communication with the space of said first chamber in the second position of said member and closed to said first chamber in the first position of said member, a fifth conduit in said body connectible to a supply of oxygen and in communication with said first chamber, a sixth conduit in said body connectible to a supply of combustible gas and communicating with said first conduit, means urging said member to its second position, and means for moving said member to its first position.

3. A flame cutter for under-water use comprising an annular nozzle, a central nozzle mounted within said annular nozzle, a protective shield surrounding said nozzles, a conduit for supplying combustible gas to said annular nozzle, a second conduit for supplying air or oxygen to said annular nozzle, a third conduit for supplying cutting oxygen to said central nozzle, a fourth conduit for supplying combustion-supporting gas to said shield, a valve block connected to said conduits a chamber in said body, a valve member translatable within said chamber and including two spaced portions closely fitting said chamber and a portion intermediate said spaced portions and separated from the wall of said chamber by a space in communication with said second conduit, a second chamber in said valve block and communicating with said third conduit, said second chamber communicating with said first chamber in a certain position of said valve member and said first and second chambers being closed to one another in a second position of said member, said fourth conduit being in communication with the space of said first chamber in the second position of said member and closed to said first chamber in the first position of said member, a fifth conduit in said body connectible to a supply of oxygen and in communication with said first chamber, a sixth conduit in said body connectible to a supply of combustible gas and communicating with said first conduit, and means for moving said member.

4. A flame cutter for under-water use comprising an annular nozzle, a central nozzle mounted within said annular nozzle, a protective shield surrounding said nozzles, a conduit for supplying combustible gas to said annular nozzle, a second conduit coaxial with said first conduit for supplying air or oxygen to said annular nozzle, a third conduit for supplying cutting oxygen to said central nozzle, a fourth conduit for supplying combustion-supporting gas to said shield, a valve block connected to said conduits a chamber in said body, a valve member movable within said chamber and including two spaced portions closely fitting said chamber and a portion intermediate said spaced portions and separated from the wall of said chamber by a space in communication with said second conduit, a second chamber in said valve block and communicating with said third conduit, said second chamber communicating with said first chamber in a certain position of said valve member and said first and second chambers being closed to one another in a second position of said member, said fourth conduit being in communication with the space of said first chamber in the second position of said member and closed to said first chamber in the first position of said member, a fifth conduit in said body connectible to a supply of oxygen and in communication with said first chamber, a sixth conduit in said body connectible to a supply of combustible gas and communicating with said first conduit, and means for moving said member.

5. A flame cutter for under-water use comprising an annular nozzle, a central nozzle within the annular nozzle, a protective shield surrounding said nozzles, means connected to said nozzles and shield and enclosing a mixing chamber communicating with said annular nozzle, a gas supply conduit for supplying combustible gas to said mixing chamber, a conduit for supplying combustion-supporting gas to said mixing chamber, a cutting oxygen supply conduit for supplying cutting oxygen to said central nozzle, a supply conduit for supplying air or oxygen to said shield, and a manually operable control valve mechanism controlling said cutting-oxygen supply conduit and shield supply conduit respectively, said valve mechanism having one position for closing said shield supply conduit and opening said cutting-oxygen supply conduit and another position for closing said cutting oxygen supply conduit and opening said shield supply conduit.

6. A flame cutter for under-water use comprising an annular nozzle, a central nozzle within said annular nozzle, a protective shield surrounding said nozzles, means connected to said nozzles and shield and enclosing a mixing chamber communicating with said annular nozzle, a gas supply connection, an oxygen supply connection, a gas conduit connecting said gas supply connection to said mixing chamber, a valve-controlled oxygen conduit connecting said oxygen supply connection to said central nozzle, a valve-controlled oxygen conduit connecting said oxygen supply connection to said protective shield, and valve operating mechanism having one position for closing said first-mentioned valve-controlled oxygen conduit and opening said second-mentioned valve-controlled oxygen conduit and having another position for closing said second-mentioned valve-controlled oxygen conduit and opening said first-mentioned valve-controlled oxygen conduit.

7. A flame cutter for under-water use comprising an annular nozzle, a central nozzle within said annular nozzle, a protective shield surrounding said nozzles, means connected to said nozzles and shield and enclosing a mixing chamber communicating with said annular nozzle, a valve body having a valve chamber, in said body a gas supply connection, an oxygen supply connection, a gas conduit connecting said gas supply connection to said mixing chamber, conduit means interconnecting said oxygen supply connection, valve chamber and mixing chamber, a cutting oxygen conduit connecting said valve chamber to said central nozzle, a shield supply conduit connecting said valve chamber to said protective shield, valve means in said valve chamber closable for cutting off said cutting oxygen conduit, and valve means mechanically coupled to said first-mentioned valve means for cutting off said shield supply conduit when said first-mentioned valve means is open and for establishing communication between said shield supply conduit and valve chamber when said first-mentioned valve means is closed.

WALTER THOMAS PATRICK KIRKHAM.

REFERENCES CITED

The following references are of record in the file of this patent:

UNITED STATES PATENTS

| Number | Name | Date |
| --- | --- | --- |
| Re. 16,307 | McCutcheon | Mar. 30, 1926 |
| 709,830 | Snow | Sept. 23, 1902 |
| 1,701,211 | Muscillo | Feb. 5, 1929 |
| 1,771,511 | Quelch | July 29, 1930 |
| 2,043,982 | Bruneau | June 16, 1936 |
| 2,190,356 | Fausek et al. | Feb. 13, 1940 |
| 2,224,171 | Van Triest | Dec. 10, 1940 |

FOREIGN PATENTS

| Number | Country | Date |
| --- | --- | --- |
| 60,297 | Austria | July 25, 1913 |
| 88,358 | Austria | May 10, 1922 |